April 18, 1933.   R. PENN   1,904,326
AUTOMATIC CONTROLLING DEVICE
Filed Dec. 19, 1927   2 Sheets-Sheet 1

Witness
Roy Rusher

Inventor
Ralph Penn
by Bair & Freeman Attorneys

April 18, 1933.    R. PENN    1,904,326
AUTOMATIC CONTROLLING DEVICE
Filed Dec. 19, 1927    2 Sheets-Sheet 2
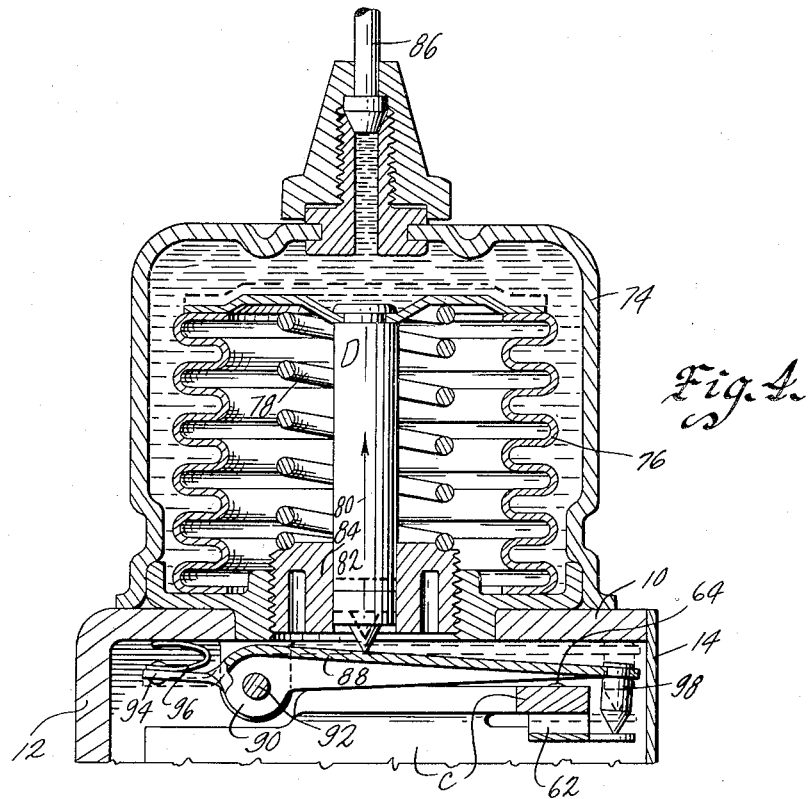
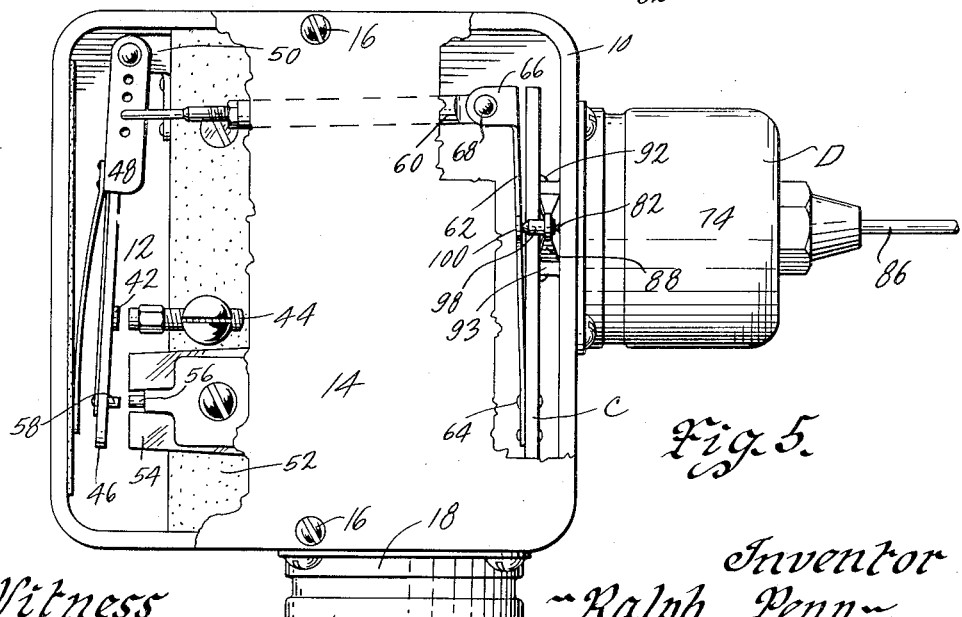
Witness
Roy Rusher
Inventor
Ralph Penn
by Bair & Freeman Attorneys Patented Apr. 18, 1933

1,904,326

UNITED STATES PATENT OFFICE

RALPH PENN, OF DES MOINES, IOWA, ASSIGNOR TO PENN ELECTRIC SWITCH CO., OF DES MOINES, IOWA, A CORPORATION OF IOWA

AUTOMATIC CONTROLLING DEVICE

Application filed December 19, 1927. Serial No. 241,076.

The object of my invention is to provide an automatic controlling device or switch adapted to be operated for making and breaking an electric circuit and at the same time to provide means which operate independent of the normal means for making and breaking the circuit which means when operated is not affected by the normal means which makes and breaks the electric circuit.

Still a further object is to provide a switch mechanism wherein a temperature controlled element is used for imparting movement to a movable contact member for making and breaking an electric circuit, the connection between the temperature controlled element and the movable contact being one that allows for movement of the contact and temperature element either in unison or independent of each other and a separate element in operative relationship to the movable contact member for moving it to position where an electric circuit will be broken without in any way being materially affected by the position or further operation of the temperature controlled element.

It may be here mentioned that in switch mechanisms where an electric circuit is made or broken for stopping and starting a motor which in turn operates a refrigerating plant or system, that such switch is normally operated by means of elements which are responsive to changes in temperature to the end that when the temperature in the refrigerating plant or system is too high, then the motor starts and when the temperature of the refrigerating system is low or at the proper amount, then the motor stops.

It is however, desirable to provide a safety device for automatically breaking the electric circuit and stopping the motor when the refrigerating mechanism is out of order or not functioning properly and the gas or pressure thereof reaches more than a predetermined amount even though the temperature is high.

In some instances the temperature in the refrigerating plant might be sixty degrees and the temperature controlled element would move the movable switch contact member to closed position whereas due to some out of order condition of the refrigerating apparatus itself, the pressure within the system might be quite high and it is my object, therefore, to provide a safety device controlled by the refrigerant for automatically breaking the electric circuit independent of the temperature controlled device and without any effect thereupon.

Still another object is to provide a spring connection between the movable contact member of the switch and the temperature controlled element which spring is in engagement with the refrigerant controlled movable element so that the spring will yield somewhat before the refrigerant element moves the safety to break the circuit and move the movable contact wherein the ultimate movement of the movable contact member will be quick acting.

My present invention is an improvement upon my copending application Serial Number 193,316, filed May 21, 1927 upon a pressure actuated switch.

With these and other objects in view my invention consists in the construction, arrangement and combination of the various parts of my device, whereby the objects contemplated are attained, as hereinafter more fully set forth, pointed out in my claims and illustrated in the accompanying drawings, in which:—

Figure 4 is an enlarged detail sectional view taken on the line 4—4 of Figure 2; and Figure 5 is a plan view of the controlling device showing the parts in position where the refrigerant controlled element has moved the parts to such position where the contact members are separated.

Figures 1, 2, 3:
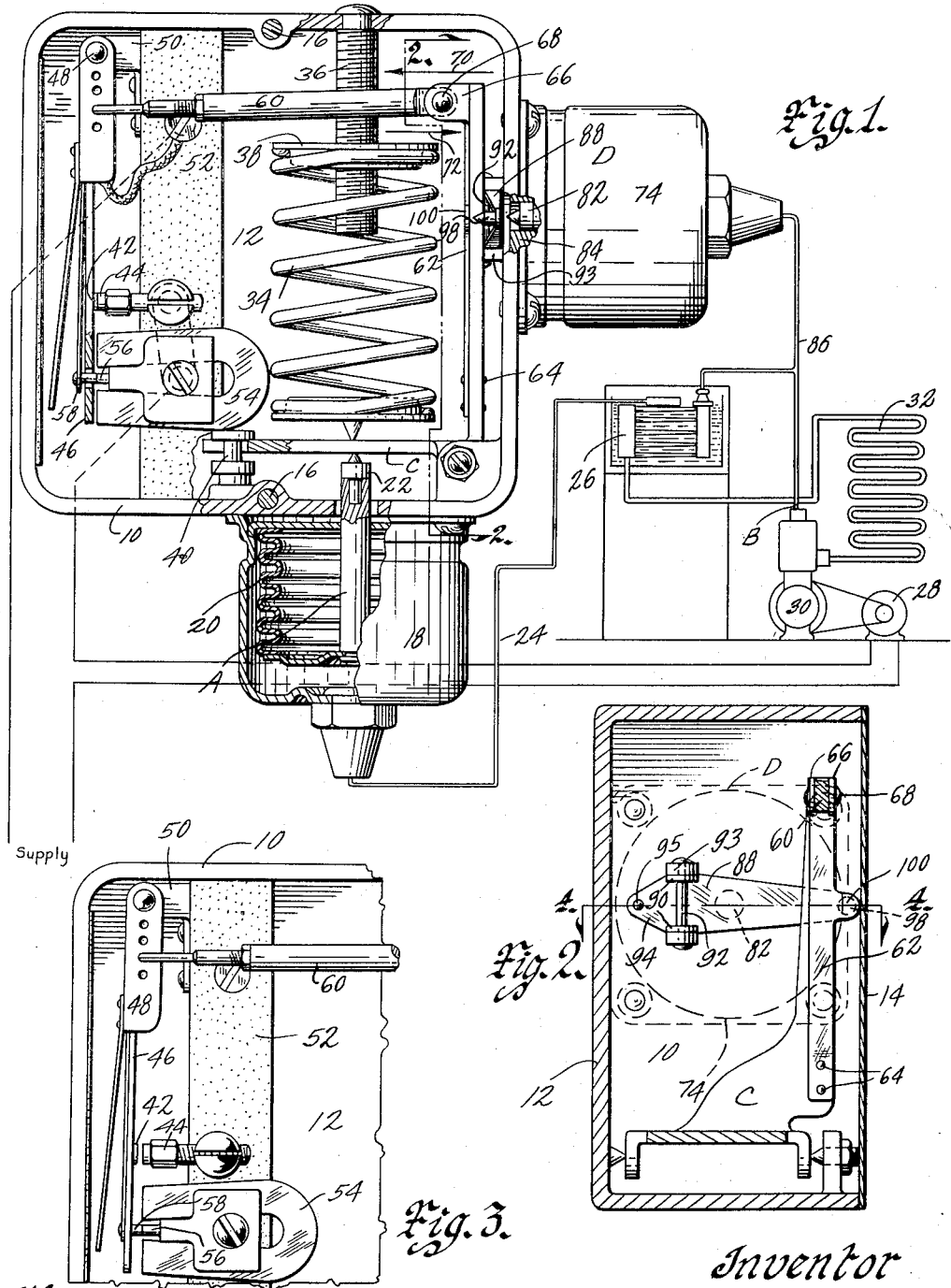
Figure 1 is a diagrammatic view of a refrigerating system with my automatic controlled device in enlarged form shown in the system.
Figure 2 is a sectional view taken on the line 2—2 of Figure 1.
Figure 3 illustrates a portion of the automatic controlling device with the parts in a different position from that shown in Figure 1 of the drawings.

In the accompanying drawings, I have used the reference numeral 10 to indicate generally a shell or casing in which the switch mechanism and the actuating parts are mounted. The shell or casing 10 includes a bottom or back wall 12 and a front cover plate 14. The cover plate 14 or front side is held in position by means of screws or the like 16.

The controlling device further includes a variable pressure actuated mechanism A. The mechanism A is mounted upon the casing 10 and includes a housing 18 having a bellows element 20 therein which when expanding or contracting imparts reciprocating movement to a spindle or the like 22.

A lead pipe 24 is connected to the variable pressure actuated mechanism A and has its other end mounted within a brine tank or the like 26. The brine tank forms part of a refrigerating apparatus B. In addition to including the brine tank 26, the refrigerating apparatus includes an electric motor 28, a pump 30 and a cooling coil 32.

The parts just described are of the ordinary construction now found in mechanical refrigerating apparatuses. The pipe 24 controls the mechanism A, so as a matter of fact, it may be said that the mechanism A is temperature controlled or regulated.

The variation in temperature within the brine tank or within the refrigerating apparatus itself, imparts movement to the spindle 22 as the bellows 20 expands or contracts. A bell crank lever C is mounted within the casing 10 and has one end of the spindle 22 abutting thereagainst.

A spring 34 is in operative relationship to the bell crank lever C and is capable of adjustment by means of the screw 36 and the plate 38 mounted thereon. The tension of the spring 34 may be varied.

It will be noted that the temperature controlled mechanism A tends to move the lever C in one direction while the spring 34 tends to resist such movement and to move the bell crank lever in the opposite direction.

A limiting pin 40 is mounted in the casing and has one end of the bell crank lever C in engagement therewith, so that movement of the bell crank lever in either direction may be limited by the pin 40. The purpose of the movement of the bell crank lever C is to automatically make and break an electric circuit for starting or stopping the motor 28.

The electric circuit includes a movable contact member 42 and a fixed contact member 44. The movable contact member 42 is mounted upon an armature arm 46 which is pivoted as at 48 to a bracket 50 mounted upon a bar of insulating material 52. The bar 52 is mounted in the casing 10.

A magnet 54 is mounted upon the bar 52 and contains an auxiliary contact 56 which is arranged to coact with a movable contact 58 mounted upon the armature arm 46. The magnet 54 tends to draw the armature arm towards it and to completely establish the electric circuit through the contacts 42 and 44. The use of the auxiliary contacts 56 and 58 and the magnet 54 form no particular part of my present invention except in the general combination.

The specific construction of the parts just described are those found in my copending application herein referred to.

The armature arm is connected to the bell crank lever C by a connection or connecting rod 60. It will be noted that movement of the bell crank lever C in either direction will impart movement to the armature arm 46 towards or from the fixed contact member 44. The connecting rod 60 is not directly connected to the bell crank.

The connection between the bell crank lever C and the armature arm 46 includes a flat leaf spring 62 having its lower end fixed to the bell crank by means of rivets or the like 64. The upper end of the leaf spring is formed with a pair of ears 66 which receive the connecting rod 60 and together with the rivet or pin 68 form the pivotal connection between the leaf spring 62 and the rod 60.

It will be noted that movement of the bell crank lever C in the direction indicated by the arrow 70, will move the rod 60 in the same direction and swing the armature arm 46 away from the fixed contact 44. Movement of the bell crank lever C in a direction indicated by the arrow 72, will bring the armature arm 46 towards the fixed contact 44 although as a matter of fact, the leaf spring 62 will allow the bell crank lever C to continue to move without any effect upon the connecting rod 60 or the armature arm 46 after it has moved to closed position. The continued movement of the bell crank lever C after the contact has been made, is taken care of by the flexing of the leaf spring 62.

It is desirable to control the electric circuit independent of the mechanism just described for normally accomplishing that purpose and I provide a control which automatically operates dependent upon or controlled by the refrigerant.

In some cases the refrigerant for some unforeseen reason, reaches an exceedingly high pressure without producing sufficient refrigeration. In such case, it is desirable to automatically stop the motor even though the temperature controlled unit calls for more refrigeration. In order to accomplish this result, I mount a refrigerant controlled automatically movable element D upon the casing 10.

The element D includes an outside shell 74 having a bellows 76 therein. Within the bellows 76 is placed a coil spring 78 which tends to move the bellows in the direction indicated by the arrow 80.

The shell 74 is in air tight relationship to the casing 10 and forms a complete chamber.

Fixed to the bellows 78 is a control pin 82 which projects through the nut 84 and through an opening in the casing 10.

The nut 84 is provided with wrench fittings or openings so that the tension of the spring 78 may be adjusted by rotation of the nut 84. The refrigerant controlled element D is in communication with the refrigerating apparatus by means of a conduit or pipe 86.

When the pressure of the refrigerating apparatus reaches a maximum amount, it fills the chamber formed by the shell 74 causing the bellows 78 to be compressed or contracted. This, of course, occurs against the action of the spring and the contraction of the bellows 76 tends to move the pin 82 inwardly into the casing 10.

A swinging arm 88 is formed with a pair of ears 90 through which a pivot pin 92 is extended whereby the arm 88 is capable of slight pivotal or swinging movement. One end of the arm 88 is offset as at 94 so that a small spring 96 may be interposed between such offset end and the casing 10 as clearly illustrated in Figure 4 of the drawings.

The small spring 96 tends to hold the arm 88 in contact or against the wall of the casing 10. Upon the opposite end of the arm 88 I provide a pin or the like 98 which is arranged to engage an offset lug or ear 100 formed upon the connecting spring 62. The pin 82 of the element D is arranged to engage the back side of the arm 88 for causing it to move away from the wall of the casing 10.

Movement of the arm 88 in turn causes the pin 98 thereon, to engage the lug 100 of the spring 62 and to move it away from the bell crank lever C which in turn will cause the armature arm 46 to move away from the contact member 44.

The element D is refrigerant controlled and functions only when the pressure within the refrigerating apparatus reaches a maximum degree.

It will be noted that the spring 62 and its cooperation with the refrigerant controlled element D, enables the armature arm to move away from the contact member 44 independent of the temperature controlled means A or the spring 34 and without any effect thereupon.

The spring 62 will bow outwardly between its ends when the arm 88 is moved away from the wall of the casing under pressure of the refrigerant controlled element D. After a certain amount of movement has been accomplished by the element D, then the upper end of the leaf spring 62 will spring over to position where it will give to the connecting rod 60 and the armature arm 46, a quick action for breaking the contacts.

It will, of course, be understood that the magnet 54 will resist to a certain degree, the breaking of the contacts and therefore, for a certain length of time, the spring 62 will be flexed or bowed outwardly it being restrained against moving the armature 46 by the magnetic influence of the magnet 54.

When the refrigerant element D has functioned to such an extent and has moved the spring 62 to such a degree that it has overcome the resistance of the magnetic influence then and thereafter, the armature arm will spring away from the contact member 44 and from its magnetic influence with a sudden snap action.

Any movement of the lever C caused by the temperature controlled element A, will have no effect upon the making or breaking of the electric circuit or in bringing the contact members into engagement or out of engagement when the refrigerant controlled element D has functioned for disengaging the contact members.

The motor 28 may thus be closed or shut off by either the temperature controlled mechanism or by the refrigerant controlled mechanism. The refrigerant controlled mechanism serves as a safety device for preventing excessive use of the motor and burning it out in case of something going wrong with the apparatus.

The leaf spring 62 therefore, serves as a means of connection between the armature arm 46 and the refrigerant controlled element D whereby the armature arm 46 may be moved without any resistance or effect thereupon of the temperature controlled means A.

The refrigerating controlled element D which serves as a safety measure may function for breaking the circuit without having to overcome any resistance which may be offered by the temperature controlled element A thus allowing the armature arm 46 to move away from the contact member 44 absolutely independent of the operation of the temperature controlled element A and the effect thereof upon the lever C, the independent movement of the armature arm 46 being permitted by use of the spring 62.

The spring 62 also serves the purpose of giving to the armature arm a sudden snap movement after it has been flexed or moved by the refrigerant controlled element D a certain amount wherein the contacts may be quickly disengaged.

Some changes may be made in the construction and arrangement of the parts of my device without departing from the real spirit and purpose of my invention and it is my intention to cover by my claims, any modified forms of structure or use of mechanical equivalents, which may be reasonably included within their scope.

I claim as my invention:—

1. For use with an actuating member, an electric switch and a resilient connection between said actuating member and said switch, a safety device of the class described comprising a pivoted lever adapted to be moved to a position engaging said resilient connection for opening said switch, means normally constraining said lever to remain spaced from said resilient connection and pressure responsive means adapted upon abnormal pressure conditions to move said lever to cause engagement thereof with said resilient connection and move said connection against the action of said means normally constraining it to remain spaced therefrom and to thereby open said switch.

2. For use with an actuating member, an electric switch and a resilient connection between said actuating member and said switch, a safety device of the class described comprising a pivoted lever adapted to be moved to a position engaging said resilient connection for opening said switch, resilient means normally constraining said lever to remain spaced from said resilient connection and pressure responsive means adapted upon abnormal pressure conditions to move said lever to cause engagement thereof with said resilient connection and move it against the action of said resilient means to thereby open said switch.

Des Moines, Iowa, December 14, 1927.

RALPH PENN.